US012709144B2

(12) United States Patent
Ozawa et al.

(10) Patent No.: US 12,709,144 B2
(45) Date of Patent: Aug. 18, 2026

(54) VEHICLE

(71) Applicant: HONDA MOTOR CO., LTD., Tokyo (JP)

(72) Inventors: Hiroyuki Ozawa, Tokyo (JP); Yuya Furusaki, Tokyo (JP); Masaji Sawa, Tokyo (JP); Yasuyuki Shibata, Tokyo (JP); Masaki Takahashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 358 days.

(21) Appl. No.: 18/589,963

(22) Filed: Feb. 28, 2024

(65) Prior Publication Data

US 2024/0317038 A1 Sep. 26, 2024

(30) Foreign Application Priority Data

Mar. 24, 2023 (JP) ................................ 2023-048810

(51) Int. Cl.

| | |
|---|---|
| ***B60K 1/04*** | (2019.01) |
| ***B62D 21/02*** | (2006.01) |
| ***B62D 21/15*** | (2006.01) |
| ***B62D 27/06*** | (2006.01) |

(52) U.S. Cl.

CPC ................ *B60K 1/04* (2013.01); *B62D 21/02* (2013.01); *B62D 21/155* (2013.01); *B62D 27/065* (2013.01)

(58) Field of Classification Search

CPC ........ B60K 1/04; B62D 21/02; B62D 21/155; B62D 27/065

See application file for complete search history.

(56) References Cited

U.S. PATENT DOCUMENTS

| | | | | |
|---|---|---|---|---|
| 11,192,586 | B2 * | 12/2021 | Kubota | B60K 1/04 |
| 12,434,546 | B2 * | 10/2025 | Boeck | B60K 1/04 |
| 12,448,047 | B2 * | 10/2025 | Oguri | B62D 21/11 |
| 2019/0061507 | A1 * | 2/2019 | Nitta | B60L 50/66 |
| 2019/0322164 | A1 * | 10/2019 | Sasaki | B62D 21/155 |
| 2019/0359260 | A1 * | 11/2019 | Tsuyuzaki | H01M 50/249 |
| 2020/0086928 | A1 * | 3/2020 | Morimoto | B62D 25/20 |
| 2022/0144064 | A1 * | 5/2022 | Tatsuwaki | H01M 50/242 |
| 2023/0022199 | A1 * | 1/2023 | Orchard | B62D 21/15 |
| 2023/0163390 | A1 * | 5/2023 | Wassmur | H01M 50/204 180/271 |
| 2025/0286195 | A1 * | 9/2025 | Nishiki | H01M 50/242 |

FOREIGN PATENT DOCUMENTS

| | | |
|---|---|---|
| JP | 2018-140711 A | 9/2018 |

* cited by examiner

*Primary Examiner* — Brian L Swenson
(74) *Attorney, Agent, or Firm* — Paratus Law Group, PLLC

(57) ABSTRACT

A vehicle includes: a front side frame; a front subframe; a first fixing portion fixing the front subframe and the front side frame with a first bolt; a battery pack; a first bracket coupling the battery pack and the front side frame; a second fixing portion fixing the first bracket to the front side frame with a second bolt; and a third fixing portion fixing the first bracket to the battery pack with a third bolt, wherein the battery pack includes: a bottom wall, and a front wall, the second fixing portion is provided with a contact surface at a position facing the first fixing portion, the third fixing portion is provided at a front end of the bottom wall of the battery pack, and the first bracket includes a first load transmitting portion that is fixed to the second fixing portion and the third fixing portion.

7 Claims, 4 Drawing Sheets

U
L
Rr
D
R
Fr
40
61
43
31
30
31
41
42
51
53
21
20
11
3
5
10

Rr
L
U
D
R
Fr
40
42
55
53
51
61
21
22

Rr
U
D
Fr
42
46
43
41
40
31
30
45
65
S1
63
66
61
55
D2
53
D1
64
20
21
22
51
10
11
3
5

VEHICLE

CROSS-REFERENCE TO RELATED APPLICATIONS

This application is based on and claims priority under 35 USC 119 from Japanese Patent Application No. 2023-048810 filed on Mar. 24, 2023, the entire content of which is incorporated herein by reference.

TECHNICAL FIELD

The present invention relates to a vehicle.

BACKGROUND ART

In recent years, researches and developments have been conducted on a secondary battery which contributes to improvement in energy efficiency in order to allow more people to have access to affordable, reliable, sustainable and advanced energy. Especially, with regard to vehicles, due to increasing awareness of global environment protection in recent years, electrification of drive sources such as hybrid vehicles and electric vehicles is rapidly progressing. Among electric vehicles, there is known an electric vehicle in which a battery pack accommodating a battery is disposed under a floor.

In such an electric vehicle in which the battery pack is disposed under the floor, when a load is input to a subframe of a vehicle body in an event of a frontal collision of the electric vehicle for example, a rear end of the subframe retreats, and therefore various measures have been taken to avoid interference with the battery pack.

For example, JP2018-140711A describes a structure in which a lever fulcrum is provided in a floor structure of an electric vehicle, which forms a point of action for releasing fastening of a subframe to a subframe mount member. The lever fulcrum encourages a rear portion of the subframe to fall off in a collision, so that interference with the battery pack can be prevented.

SUMMARY

The related art is based on an idea that a fastening point between the subframe and the vehicle body is broken so that a bracket acts as a slide, and the subframe is set behind a front end of the battery pack and passes by the battery pack in a height direction.

The present invention provides a vehicle that can protect a battery inside a battery pack when a front subframe retreats, which is a vehicle based on a new protection idea that is different from the protection idea of making the subframe pass by the battery pack. It further contributes to improvement in energy efficiency.

According to the present invention, a load input from the front side to the front subframe can be distributed to the front side frame and the bottom wall of the battery pack, and can also be transmitted to the bottom wall of the battery pack, which has a large size, so that the battery inside the battery pack can be protected from the retreating front subframe.

DESCRIPTION OF EMBODIMENTS

Figure 1:
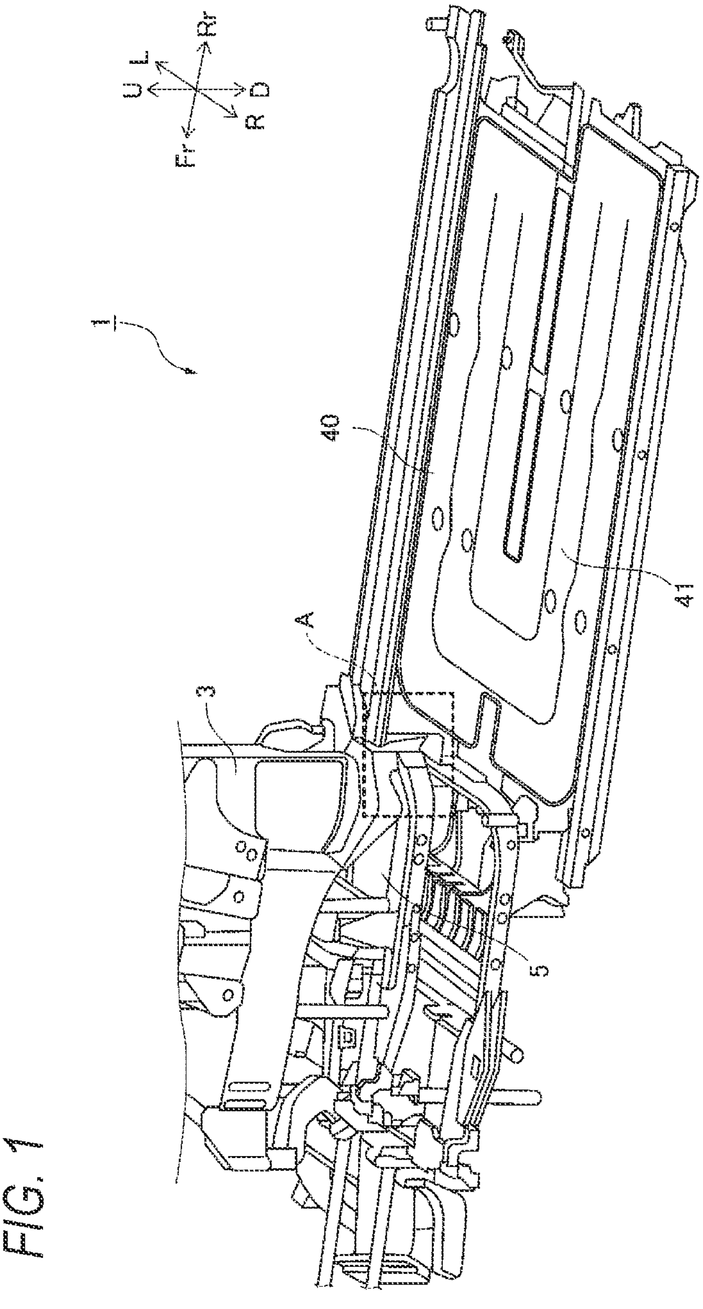
FIG. 1 is a perspective view from below of a front side frame, a front subframe, and a battery pack of a vehicle according to an embodiment.

Hereinafter, an embodiment of a vehicle according to the present invention will be described with reference to the accompanying drawings. Note that the drawings are viewed in directions of reference numerals. In the present description and the like, in order to simplify and clarify the description, a front-rear direction, a left-right direction, and an upper-lower direction are described according to directions viewed from a driver of a vehicle. In the drawings, a front side of the vehicle is shown as Fr, a rear side is shown as Rr, a left side is shown as L, a right side is shown as R, an upper side is shown as U, and a lower side is shown as D.

As shown in FIG. 1, a vehicle 1 according to the present embodiment includes front side frames 3 extending in the front-rear direction, a front subframe 5 extending in the front-rear direction on an inner side of the front side frames 3 in the vehicle width direction, and a battery pack 40. The front side frames 3 are frames arranged on both side surfaces of a front part of the vehicle 1. The front subframe 5 is a frame disposed between the two front side frames 3 in the front part of the vehicle 1.

The battery pack 40 is a flat member that has a rectangular shape in a plan view and has a predetermined thickness. The battery pack 40 is mounted under a floor of the vehicle 1 for driving a drive source driven by electric power. The drive source driven by electric power is, for example, a vehicle drive motor. In the present embodiment, the battery pack 40 is disposed behind the front subframe 5 and accommodates a battery therein.

Figure 2:
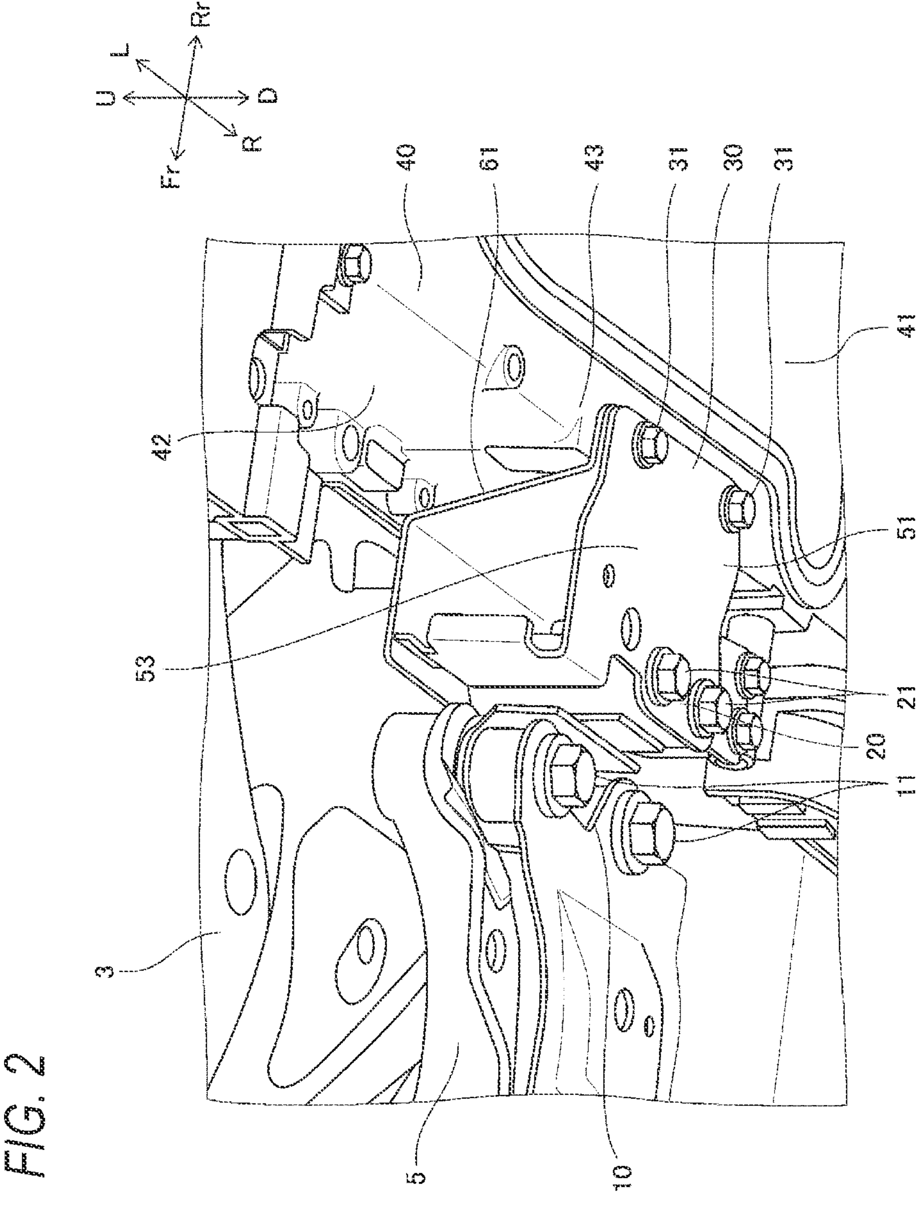
FIG. 2 is an enlarged view of an area A in FIG. 1.

As shown in FIG. 2, the first fixing portion 10 fixes a rear end of the front subframe 5 and the front side frames 3. The first fixing portion 10 includes a first bolt 11 extending in the upper-lower direction, and the first bolt 11 sequentially passes through the rear end of the front subframe 5 and the front side frames 3, and fastens the two.

The vehicle 1 includes a first bracket 51 that is disposed between the front subframe 5 and the battery pack 40 and couples a front portion of the battery pack 40 and the front side frames 3. In the present embodiment, the first bracket 51 is made of a metal plate processed into a substantially L-shape in a side view.

Specifically, a second fixing portion 20 fixes the first bracket 51 to the front side frames 3, and a third fixing portion 30 fixes the first bracket 51 to the front portion of the battery pack 40. The second fixing portion 20 includes a second bolt 21 extending in the upper-lower direction, and the second bolt 21 sequentially passes through the first bracket 51 and the front side frame 3, and fastens the two. The third fixing portion 30 includes a third bolt 31 extending in the upper-lower direction, and the third bolt 31 sequentially passes through the first bracket 51 and the front portion of the battery pack 40 and fastens the two. As will be described later, the second bolt 21 also passes through a second bracket 61 disposed between the first bracket 51 and the front side frames 3 (see FIG. 3).

The battery pack 40 includes a flat bottom wall 41 that forms a bottom surface, and a wall-like front wall 42 that stands upward from the bottom wall 41 and extends in the vehicle width direction and forms a front surface of the battery pack 40.

Figure 3:
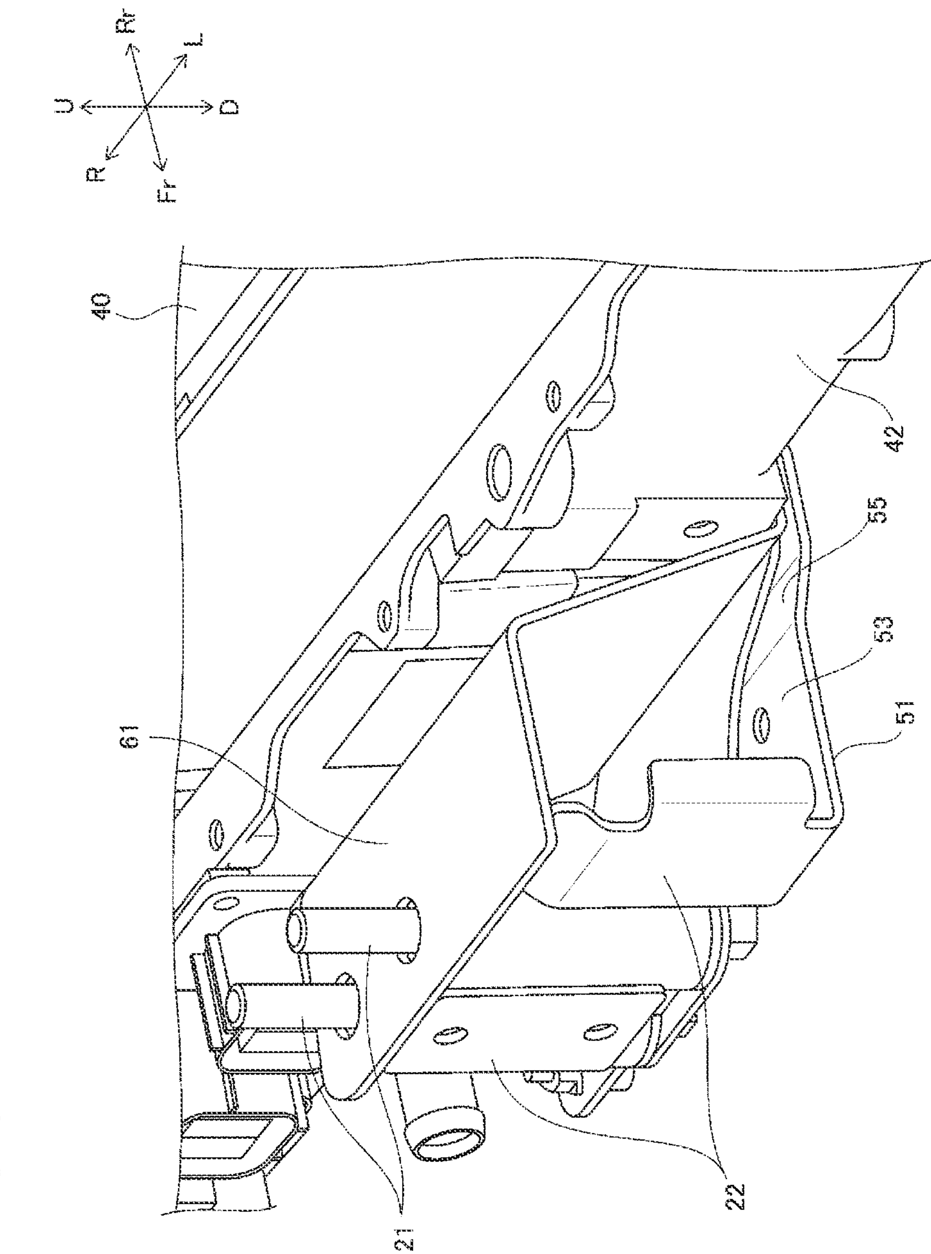
FIG. 3 is a perspective view of a part shown in FIG. 2, as viewed from above.

The second fixing portion 20 is provided at a position overlapping the first fixing portion 10 when viewed from the front-rear direction. As shown in FIG. 3, the second fixing portion 20 is provided with a contact surface 22 at a position facing the first fixing portion 10. In the present embodiment, the contact surface 22 is defined by one surface of the first bracket 51 that is substantially L-shaped and extends in the upper-lower direction.

The third fixing portion 30 is provided at a front end 43 of the bottom wall 41 of the battery pack 40. In this way, the first bracket 51 includes a first load transmitting portion 53 that extends in the front-rear direction and is fixed to the second fixing portion 20 and the third fixing portion 30.

According to the present embodiment, when a load is input to the front subframe 5 from the front side due to a frontal collision of the vehicle 1 or the like, the front subframe 5 retreats and comes into contact with the contact surface 22 of the second fixing portion 20. Then, the second fixing portion 20 transmits the load input from the front side to the front subframe 5 to the front side frames 3 and also transmits the load to the bottom wall 41 of the battery pack 40 via the first bracket 51. Accordingly, the load input from the front side to the front subframe 5 can be distributed to the front side frames 3 and the bottom wall 41 of the battery pack 40, and can also be transmitted to the bottom wall 41 of the battery pack 40, which has a large size, so that the battery inside the battery pack 40 can be protected from the retreating front subframe 5.

Figure 4:
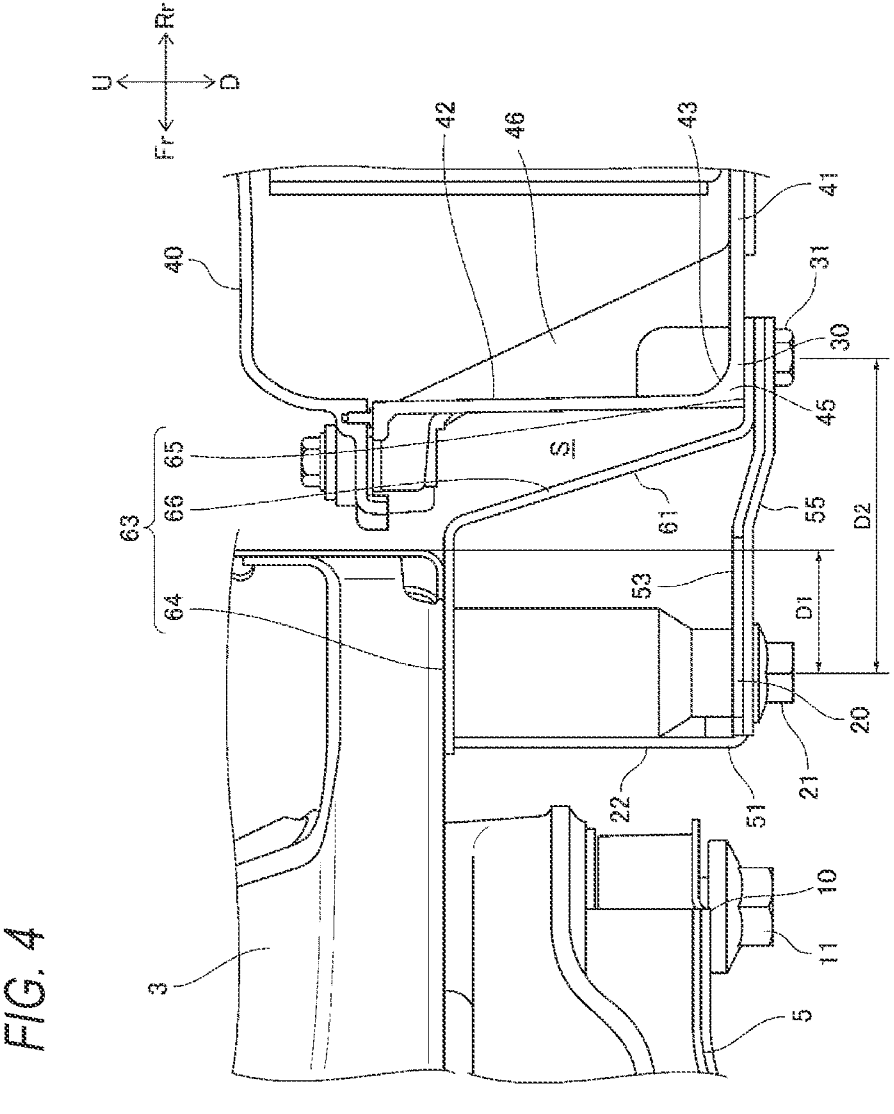
FIG. 4 is an enlarged side view of a first fixing portion, a second fixing portion, and a third fixing portion.

As described above, in the second fixing portion 20, the second bolt 21 extends in the upper-lower direction, and in the third fixing portion 30, the third bolt 31 extends in the upper-lower direction. As shown in FIG. 4, a distance D1 between an axial center of the second bolt 21 and a rear end of the front subframe 5 is shorter than a distance D2 between the axial center of the second bolt 21 and an axial center of the third bolt 31.

According to such a configuration, the contact surface 22 can be displaced closer to the rear end of the front subframe 5, so that when a load is input to the front subframe 5 from the front side and the front subframe 5 retreats, robustness in a displacement direction of the retreating front subframe 5 is high, and the retreating front subframe 5 more reliably comes into contact with the contact surface 22.

The first load transmitting portion 53 of the first bracket 51 is provided with a buckling portion 55 that extends in the vehicle width direction and bends in the upper-lower direction. The buckling portion 55 is formed by bending, in the upper-lower direction, one surface of the first bracket 51 that is substantially L-shaped and extends in the front-rear direction.

Accordingly, when a large load greater than a predetermined value is input to the second fixing portion 20, the buckling portion 55 buckles, thereby reducing the load transmitted to the bottom wall 41 of the battery pack 40. As a result, when a load less than a predetermined value is input to the second fixing portion 20, the buckling portion 55 does not buckle and transmits the load to the third fixing portion 30, so that a withstand load of the second fixing portion 20 increases, and even when a large load greater than a predetermined value is input to the second fixing portion 20, the buckling portion 55 can absorb the load and prevent the battery pack 40 from deforming, thereby protecting the battery inside the battery pack 40.

Furthermore, the vehicle 1 of the present embodiment includes the second bracket 61 that is disposed between the front subframe 5 and the battery pack 40, extends in the front-rear direction, and couples the front portion of the battery pack 40 and the front side frames 3. The second bracket 61 includes a second load transmitting portion 63 that extends in the front-rear direction and is fixed to the second fixing portion 20 and the third fixing portion 30.

In the second fixing portion 20, the second bracket 61 is fixed to the front side frames 3 by the second bolt 21 above the first bracket 51. That is, as shown in FIG. 3, the second bolt 21 sequentially passes through the first bracket 51 and the second bracket 61 from below, and as shown in FIG. 4, the second bolt 21 is fastened to bottom surfaces of the front side frames 3.

According to such a configuration, the load applied to the second fixing portion 20 above the first bracket 51 can be transmitted to the bottom wall 41 of the battery pack 40 via the second bracket 61, so that the withstand load of the second fixing portion 20 can be increased.

As shown in FIG. 4, the second load transmitting portion 63 includes a front side fastening portion 64, a rear side fastening portion 65, and a coupling portion 66. The front side fastening portion 64 faces the bottom surfaces of the front side frames 3 and is fastened to the front side frames 3 by the second bolt 21 in the second fixing portion 20. The rear side fastening portion 65 faces a bottom surface of the battery pack 40 and is fastened to the battery pack 40 by the third bolt 31 in the third fixing portion 30. The coupling portion 66 couples the front side fastening portion 64 and the rear side fastening portion 65.

A fixing position of the second bracket 61 in the second fixing portion 20 is positioned above a fixing position of the second bracket 61 in the third fixing portion 30. Therefore, the coupling portion 66 extends in front of the battery pack 40 in a downwardly inclined manner toward the rear side. In this way, a space S is formed between the front surface of the battery pack 40 and the coupling portion 66.

According to such a configuration, the coupling portion 66 of the second bracket 61 extends in front of the battery pack 40 in a downwardly inclined manner toward the rear side, and the space S is formed between the front surface of the battery pack 40 and the coupling portion 66 of the second bracket 61, so that the load can be prevented from being input from the second fixing portion 20 to the front wall 42 of the battery pack 40.

Furthermore, as shown in FIG. 4, a corner 45 where the bottom wall 41 and the front wall 42 connect to each other is provided with a rib 46 that couples the bottom wall 41 and the front wall 42. As a result, strength of the battery pack 40 can be improved by the rib 46 that couples the bottom wall 41 and the front wall 42, and the withstand load of the battery pack 40 against the load input to the front subframe 5 can be improved.

The bottom wall 41 and the front wall 42 of the battery pack 40 can be manufactured by die casting. Accordingly, the load input from the front side to the front subframe 5 can be distributed to the front side frames 3 and the bottom wall 41 of the battery pack 40, and can also be transmitted to the bottom wall 41 of the battery pack 40, which has a large size, so that the battery inside the battery pack 40 can be protected from the retreating front subframe 5, and by manufacturing the bottom wall 41 and the front wall 42 by die casting, a degree of freedom in the shape of the front wall 42 can be improved.

Although an embodiment of the present invention has been described above with reference to the accompanying drawings, it is needless to say that the present invention is not limited to the embodiment. It is apparent to those skilled in the art that various modifications or alterations can be conceived within the scope described in the claims, and it is understood that the modifications or alterations naturally fall within the technical scope of the present invention. In addition, respective constituent elements in the above embodiment may be freely combined without departing from the gist of the invention.

In the present description, at least the following matters are described. In the parentheses, the corresponding constituent elements and the like in the above embodiments are shown as an example, but the present invention is not limited thereto.

(1) A vehicle (vehicle 1), including:

a front side frame (front side frame 3) extending in a front-rear direction;

a front subframe (front subframe 5) extending in the front-rear direction on an inner side of the front side frame in a vehicle width direction;

a first fixing portion (first fixing portion 10) fixing a rear end of the front subframe and the front side frame with a first bolt (first bolt 11);

a battery pack (battery pack 40) disposed behind the front subframe and accommodating a battery therein;

a first bracket (first bracket 51) disposed between the front subframe and the battery pack and coupling a front portion of the battery pack and the front side frame;

a second fixing portion (second fixing portion 20) fixing the first bracket to the front side frame with a second bolt (second bolt 21); and a third fixing portion (third fixing portion 30) fixing the first bracket to the front portion of the battery pack with a third bolt (third bolt 31), in which the battery pack includes:

a bottom wall (bottom wall 41) forming a bottom surface of the battery pack, and a front wall (front wall 42) standing upward from the bottom wall, extending in the vehicle width direction, and forming a front surface of the battery pack, the second fixing portion is provided at a position overlapping the first fixing portion when viewed from the front-rear direction, the second fixing portion is provided with a contact surface (contact surface 22) at a position facing the first fixing portion, the third fixing portion is provided at a front end (front end 43) of the bottom wall of the battery pack, and the first bracket includes a first load transmitting portion (first load transmitting portion 53) that extends in the front-rear direction and is fixed to the second fixing portion and the third fixing portion.

According to (1), when a load is input to the front subframe from the front side due to a frontal collision of the vehicle or the like, the front subframe retreats and comes into contact with the contact surface of the second fixing portion. Then, the second fixing portion transmits the load input from the front side to the front subframe to the front side frames and also transmits the load to the bottom wall of the battery pack via the first bracket. Accordingly, the load input from the front side to the front subframe can be distributed to the front side frames and the bottom wall of the battery pack, and can also be transmitted to the bottom wall of the battery pack, which has a large size, so that the battery inside the battery pack can be protected from the retreating front subframe.

(2) The vehicle according to (1), in which in the second fixing portion, the second bolt extends in an upper-lower direction, in the third fixing portion, the third bolt extends in the upper-lower direction, and a distance between an axial center of the second bolt and a rear end of the front subframe is shorter than a distance between the axial center of the second bolt and an axial center of the third bolt.

According to (2), the contact surface can be displaced closer to the rear end of the front subframe, so that when a load is input to the front subframe from the front side and the front subframe retreats, robustness in a displacement direction of the retreating front subframe is high, and the retreating front subframe more reliably comes into contact with the contact surface.

(3) The vehicle according to (1), in which the first load transmitting portion is provided with a buckling portion (buckling portion 55) extending in the vehicle width direction and bending in the upper-lower direction.

According to (3), when a large load greater than a predetermined value is input to the second fixing portion, the buckling portion buckles, thereby reducing the load transmitted to the bottom wall of the battery pack. As a result, when a load less than a predetermined value is input to the second fixing portion, the buckling portion does not buckle and transmits the load to the third fixing portion, so that a withstand load of the second fixing portion increases, and even when a large load greater than a predetermined value is input to the second fixing portion, the buckling portion can absorb the load and prevent the battery pack from deforming, thereby protecting the battery inside the battery pack.

(4) The vehicle according to (1), further including:

a second bracket (second bracket 61) disposed between the front subframe and the battery pack, extending in the front-rear direction and coupling the front portion of the battery pack and the front side frame, in which the second bracket includes a second load transmitting portion (second load transmitting portion 63) extending in the front-rear direction and fixed to the second fixing portion and the third fixing portion, and in the second fixing portion, the second bracket is fixed to the front side frame by the second bolt above the first bracket.

According to (4), the load applied to the second fixing portion above the first bracket can be transmitted to the bottom wall of the battery pack via the second bracket, so that the withstand load of the second fixing portion can be increased.

(5) The vehicle according to claim 4, in which a fixing position of the second bracket in the second fixing portion is positioned above a fixing position of the second bracket in the third fixing portion, the second load transmitting portion includes a front side fastening portion (front side fastening portion 64) facing a bottom surface of the front side frame and fastened to the front side frame by the second bolt in the second fixing portion, a rear side fastening portion (rear side fastening portion 65) facing the bottom surface of the battery pack and fastened to the battery pack by the third bolt in the third fixing portion, and a coupling portion (coupling portion 66) coupling the front side fastening portion and the rear side fastening portion, the coupling portion extends in front of the battery pack in a downwardly inclined manner toward the rear side, and a space (space S) is formed between the front surface of the battery pack and the coupling portion.

According to (5), the coupling portion of the second bracket extends in front of the battery pack in a downwardly inclined manner toward the rear side, and the space is formed between the front surface of the battery pack and the coupling portion of the second bracket, so that the load can be prevented from being input from the second fixing portion to the front wall of the battery pack.

(6) The vehicle according to (1), in which a corner (corner 45) where the bottom wall and the front wall connect to each other is provided with a rib (rib 46) that couples the bottom wall and the front wall.

According to (6), strength of the battery pack can be improved by the rib that couples the bottom wall and the front wall, and the withstand load against the load input to the subframe can be improved.

(7) The vehicle according to (1), in which the bottom wall and the front wall are manufactured by die casting.

According to (7), the load input from the front side to the front subframe can be distributed to the front side frames and the bottom wall of the battery pack, and can also be transmitted to the bottom wall of the battery pack, which has a large size, so that the battery inside the battery pack can be protected from the retreating front subframe, and by manufacturing the bottom wall and the front wall by die casting, a degree of freedom in the shape of the front wall can be improved.

What is claimed is:

1. A vehicle, comprising:

a front side frame extending in a front-rear direction;

a front subframe extending in the front-rear direction on an inner side of the front side frame in a vehicle width direction;

a first fixing portion fixing a rear end of the front subframe and the front side frame with a first bolt;

a battery pack disposed behind the front subframe and accommodating a battery therein;

a first bracket disposed between the front subframe and the battery pack and coupling a front portion of the battery pack and the front side frame;

a second fixing portion fixing the first bracket to the front side frame with a second bolt; and a third fixing portion fixing the first bracket to the front portion of the battery pack with a third bolt, wherein the battery pack includes:

a bottom wall forming a bottom surface of the battery pack, and a front wall standing upward from the bottom wall, extending in the vehicle width direction, and forming a front surface of the battery pack, the second fixing portion is provided at a position overlapping the first fixing portion when viewed from the front-rear direction, the second fixing portion is provided with a contact surface at a position facing the first fixing portion, the third fixing portion is provided at a front end of the bottom wall of the battery pack, and the first bracket includes a first load transmitting portion that extends in the front-rear direction and is fixed to the second fixing portion and the third fixing portion.

2. The vehicle according to claim 1, wherein in the second fixing portion, the second bolt extends in an upper-lower direction, in the third fixing portion, the third bolt extends in the upper-lower direction, and a distance between an axial center of the second bolt and a rear end of the front subframe is shorter than a distance between the axial center of the second bolt and an axial center of the third bolt.

3. The vehicle according to claim 1, wherein the first load transmitting portion is provided with a buckling portion extending in the vehicle width direction and bending in the upper-lower direction.

4. The vehicle according to claim 1, further comprising:

a second bracket disposed between the front subframe and the battery pack, extending in the front-rear direction and coupling the front portion of the battery pack and the front side frame, wherein the second bracket includes a second load transmitting portion extending in the front-rear direction and fixed to the second fixing portion and the third fixing portion, and in the second fixing portion, the second bracket is fixed to the front side frame by the second bolt above the first bracket.

5. The vehicle according to claim 4, wherein a fixing position of the second bracket in the second fixing portion is positioned above a fixing position of the second bracket in the third fixing portion, the second load transmitting portion includes a front side fastening portion facing a bottom surface of the front side frame and fastened to the front side frame by the second bolt in the second fixing portion, a rear side fastening portion facing the bottom surface of the battery pack and fastened to the battery pack by the third bolt in the third fixing portion, and a coupling portion coupling the front side fastening portion and the rear side fastening portion, the coupling portion extends in front of the battery pack in a downwardly inclined manner toward the rear side, and a space is formed between the front surface of the battery pack and the coupling portion.

6. The vehicle according to claim 1, wherein a corner where the bottom wall and the front wall connect to each other is provided with a rib that couples the bottom wall and the front wall.

7. The vehicle according to claim 1, wherein the bottom wall and the front wall are manufactured by die casting.

* * * * *